United States Patent
Wang et al.

(10) Patent No.: US 12,388,073 B2
(45) Date of Patent: Aug. 12, 2025

(54) ELECTROCHEMICAL DEVICE AND ELECTRONIC DEVICE

(71) Applicant: Ningde Amperex Technology Limited, Ningde (CN)

(72) Inventors: Yougui Wang, Ningde (CN); Wanghui Hu, Ningde (CN); Quan She, Ningde (CN)

(73) Assignee: Ningde Amperex Technology Limited, Ningde (CN)

(*) Notice: Subject to any disclaimer, the term of this patent is extended or adjusted under 35 U.S.C. 154(b) by 526 days.

(21) Appl. No.: 17/709,776

(22) Filed: Mar. 31, 2022

(65) Prior Publication Data

US 2023/0076286 A1    Mar. 9, 2023

(30) Foreign Application Priority Data

Aug. 17, 2021 (CN) .......................... 202110943981.3

(51) Int. Cl.
*H01M 4/13* (2010.01)
*H01M 4/02* (2006.01)
(Continued)

(52) U.S. Cl.
CPC ............ *H01M 4/13* (2013.01); *H01M 4/667* (2013.01); *H01M 4/668* (2013.01);
(Continued)

(58) Field of Classification Search
CPC ...... H01M 4/13; H01M 50/538; H01M 4/667; H01M 4/668; H01M 10/0525; H01M 2004/021
USPC ....................................................... 429/123
See application file for complete search history.

(56) References Cited

U.S. PATENT DOCUMENTS

| 2012/0145428 A1 | 6/2012 | Tokunaga et al. |
| 2014/0072877 A1* | 3/2014 | Araki ................. H01M 10/052 29/623.5 |

(Continued)

FOREIGN PATENT DOCUMENTS

| CN | 1581556 A | 2/2005 |
| CN | 102356496 A | 2/2012 |

(Continued)

OTHER PUBLICATIONS

Extended European Search Report issued on Feb. 22, 2023, in corresponding European Application No. 22165814.9, 6 pages.

(Continued)

*Primary Examiner* — Allison Bourke
*Assistant Examiner* — Robert Gene West
(74) *Attorney, Agent, or Firm* — Maier & Maier, PLLC

(57) ABSTRACT

An electrochemical device includes an electrode assembly. The electrode assembly includes a first electrode plate, a second electrode plate, and a separator disposed between the first electrode plate and the second electrode plate. The first electrode plate includes a current collector, a tab, and an active material layer. The active material layer includes a body region and an edge region. Widths of the edge region and the body region are $W_1$ and $W_2$ respectively, and $0<W_1/W_2\leq 5\%$. Thicknesses of the edge region and the body region are $t_1$ and $t_2$ respectively, and $95\%\leq t_1/t_2\leq 100\%$. The edge region falling with the foregoing parameter ranges helps to increase the energy density of the electrochemical device, reduce lithium plating hazards, and improve the safety of the electrochemical device.

20 Claims, 5 Drawing Sheets

(51) Int. Cl.
  *H01M 4/66*      (2006.01)
  *H01M 10/0525*   (2010.01)
  *H01M 50/538*    (2021.01)

(52) U.S. Cl.
  CPC ..... *H01M 10/0525* (2013.01); *H01M 50/538* (2021.01); *H01M 2004/021* (2013.01)

(56) References Cited

U.S. PATENT DOCUMENTS

2020/0220163 A1* 7/2020 Li ..................... H01M 4/0404
2020/0313186 A1  10/2020 Wang et al.

FOREIGN PATENT DOCUMENTS

| CN | 204966628 | U |   | 1/2016  |             |
|----|-----------|---|---|---------|-------------|
| CN | 106601960 | A |   | 4/2017  |             |
| CN | 208690417 | U |   | 4/2019  |             |
| CN | 211980813 | U |   | 11/2020 |             |
| CN | 211980831 | U |   | 11/2020 |             |
| CN | 112331903 | A |   | 2/2021  |             |
| CN | 212461733 | U |   | 2/2021  |             |
| CN | 213936240 | U |   | 8/2021  |             |
| EP | 2319109   | A1|   | 5/2011  |             |
| EP | 2709193   | A1|   | 3/2014  |             |
| EP | 2319109   | B1| * | 8/2014  | H01M 10/0431|
| JP | 2010080392| A |   | 4/2010  |             |

OTHER PUBLICATIONS

Office Action issued on Jun. 17, 2022, in corresponding Chinese Application No. 202110943981.3, 10 pages.

Notice of Registration Procedures issued on Oct. 21, 2022, in corresponding Chinese Application No. 202110943981.3, 8 pages.

* cited by examiner

ELECTROCHEMICAL DEVICE AND ELECTRONIC DEVICE

CROSS-REFERENCE TO RELATED APPLICATION

This application claims priority to Chinese Patent Application No. CN202110943981.3 filed on Aug. 17, 2021, the entire disclosure of which is incorporated herein by reference.

TECHNICAL FIELD

This application relates to an electrochemical device and an electronic device including the electrochemical device.

BACKGROUND

With popularization of consumer electronics products such as a notebook computer, a mobile phone, a handheld game console, a tablet computer, a mobile power supply, and an unmanned aerial vehicle, people are posing higher requirements on an electrochemical device (such as a lithium-ion battery).

However, a high energy density and safety of the electrochemical device still cannot be ensured effectively.

SUMMARY

To overcome the foregoing disadvantages of the prior art, this application provides an electrochemical device and an electronic device containing the electrochemical device.

According to an aspect of this application, this application provides an electrochemical device, including a housing and an electrode assembly accommodated in the housing. The electrode assembly includes a first electrode plate, a second electrode plate, and a separator disposed between the first electrode plate and the second electrode plate. The first electrode plate includes a current collector, a tab, and an active material layer. The current collector includes a first end, a second end disposed opposite to the first end, and a third end and a fourth end; the third end and the fourth end are connected between the first end and the second end. The third end and the fourth end are disposed opposite to each other. The tab is integrally formed together with the current collector, and extends out of the third end. The active material layer is disposed on a surface of the current collector. The active material layer includes a body region and an edge region. Both the body region and the edge region extend from the first end to the second end. Along a direction in which the tab extends out of the third end, the edge region is closer to the third end than the body region, and is disposed contiguous to the body region. Widths of the edge region and the body region are $W_1$ and $W_2$ respectively, and $0<W_1/W_2\leq 5\%$. Thicknesses of the edge region and the body region are $t_1$ and $t_2$ respectively, and $95\%\leq t_1/t_2\leq 100\%$.

By disposing the edge region that falls within the foregoing parameter ranges, this application reduces the percentage of the area of the edge region in the active material layer, and increases the percentage of thickness of the edge region in contrast to the body region. On the one hand, the content of the active material per unit area of the edge region is increased, thereby helping to increase the energy density of the electrochemical device. On the other hand, the lithium plating hazards are reduced, thereby improving the safety of the electrochemical device.

In some embodiments of this application, the active material layer includes an active material and a binder. The active material is of a same type in the body region and the edge region, and the binder is of a same type in the body region and the edge region. In this way, in both the body region and the edge region, the current collector can be coated with the same active material slurry simultaneously, thereby reducing the coating steps.

In some embodiments of this application, the first electrode plate is a negative electrode plate. The active material includes at least one of natural graphite, artificial graphite, mesocarbon microbead, hard carbon, soft carbon, silicon, a silicon-carbon composite, silicon oxide, lithium-tin alloy, lithium-tin-oxide alloy, metallic tin, tin oxide, lithium titanium oxide, lithium-aluminum alloy, or metallic lithium. With the first electrode plate being the negative electrode plate, the edge region provides more active materials for the intercalation and deintercalation of lithium ions, thereby reducing the lithium plating hazards of the negative electrode and improving the safety of the electrochemical device.

In some embodiments of this application, the first electrode plate is a positive electrode plate. The active material includes at least one of lithium nickel cobalt manganese oxide, lithium nickel cobalt aluminum oxide, lithium iron phosphate, a lithium-rich manganese-based material, lithium cobalt oxide, lithium manganese oxide, lithium manganese iron phosphate, or lithium titanium oxide. With the first electrode plate being the positive electrode plate, the active material in the edge region provides more lithium ions, thereby helping to increase the energy density of the electrochemical device.

In some embodiments of this application, the first electrode plate further includes an insulation layer disposed on the surface of the current collector. The insulation layer extends from the first end to the second end. Along an extension direction of the tab, the insulation layer is closer to the third end than the edge region, and is disposed contiguous to the edge region or at least partly overlaps the edge region. The insulation layer disposed can prevent the separator from being pierced by burrs generated during cutting of the electrode plate, and thereby prevent a short circuit caused by contact between the positive electrode plate and the negative electrode plate; and also prevent the short circuit between the positive electrode and the negative electrode caused by factors such as shrinkage of the separator under a high temperature.

In some embodiments of this application, the insulation layer includes inorganic particles and a polymer. The inorganic particles include at least one selected from the group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, or barium sulfate. The polymer includes at least one of polypropylene alcohol, sodium polyacrylate, potassium polyacrylate, lithium polyacrylate, polyimide, polyimide imide, styrene butadiene rubber, polyvinyl alcohol, polyvinylidene fluoride, polyvinylidene difluoride, polytetrafluoroethylene, polyvinyl butyral, water-based acrylic resin, carboxymethyl cellulose and sodium carboxymethyl cellulose.

In some embodiments of this application, a width of the insulation layer is $W_3$, and 0.1 mm$\leq W_3\leq$4 mm. With the width of the insulation layer falling within the foregoing range, the burrs are prevented from being generated during the cutting of the positive electrode plate, and the coating of the insulation layer is prevented from significantly reducing the energy density of the electrochemical device.

In some embodiments of this application, $0 < W_1 \leq 4$ mm, and $10 \text{ mm} \leq W_2 \leq 600$ mm.

In some embodiments of this application, $19 \text{ μm} \leq t_1 \leq 200$ μm, and $20 \text{ μm} \leq t_2 \leq 200$ μm.

In some embodiments of this application, the electrode plate comprises a plurality of tabs. With a plurality of tabs disposed, the internal resistance of the first electrode plate can be reduced, thereby increasing the charge rate and discharge rate of the first electrode plate.

According to another aspect of this application, this application further provides an electronic device. The electronic device includes the electrochemical device.

With respect to the first electrode plate in this application, by defining the width parameter and the thickness parameter of the edge region of the active material layer, this application reduces the percentage of the area of the edge region in the active material layer, and increases the percentage of thickness of the edge region in contrast to the body region. On the one hand, the content of the active material per unit area of the edge region is increased, thereby helping to increase the energy density of the electrochemical device. On the other hand, the lithium plating hazards are reduced, thereby improving the safety of the electrochemical device.

REFERENCE NUMERALS OF MAIN COMPONENTS

Figure 1:
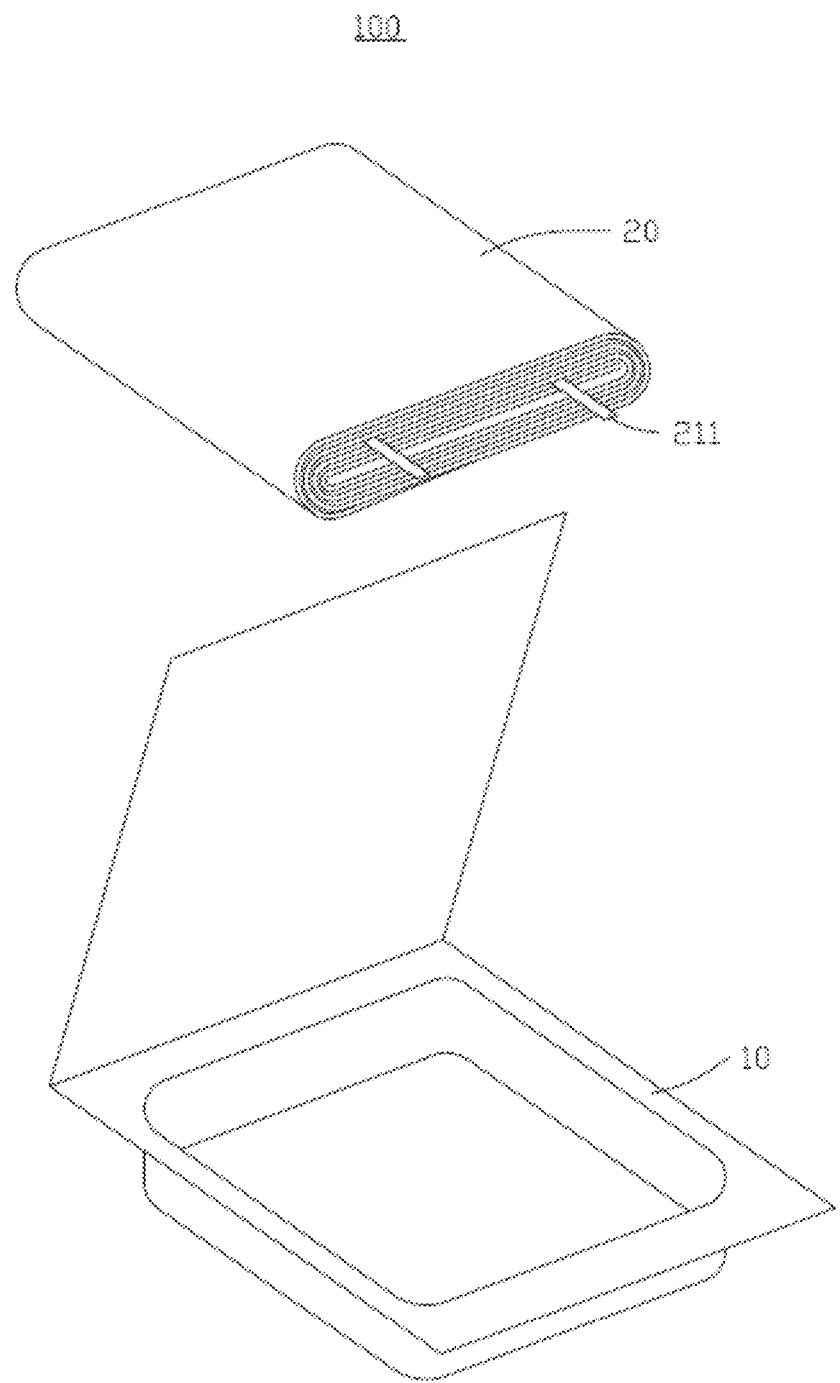
FIG. 1 is an schematic structural diagram of an electrochemical device according to an embodiment of this application.

Housing 10
Electrode assembly 20
First electrode plate 21
Second electrode plate 22
Separator 23
Insulation layer 30
Electrochemical device 100
Electronic device 200
Current collector 210
Tab 211
Active material layer 212
First end 2101
Second end 2102
Third end 2103

-continued

Fourth end 2104
Blank foil region 2110
Body region 2121
Edge region 2122
Tab extension direction $D_1$
Thickness $T_x$
Test points $P_x$
Widths $W_1$, $W_2$, $W_3$ This application is further described below with reference to the following specific embodiments and the foregoing drawings.

DETAILED DESCRIPTION

The following describes the technical solutions in the embodiments of this application clearly and thoroughly with reference to the drawings herein. Evidently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

To further expound the techniques used to achieve the preset objectives of this application and the effects thereof, the following describes this application in detail with reference with drawings and preferred embodiments.

Figure 2:
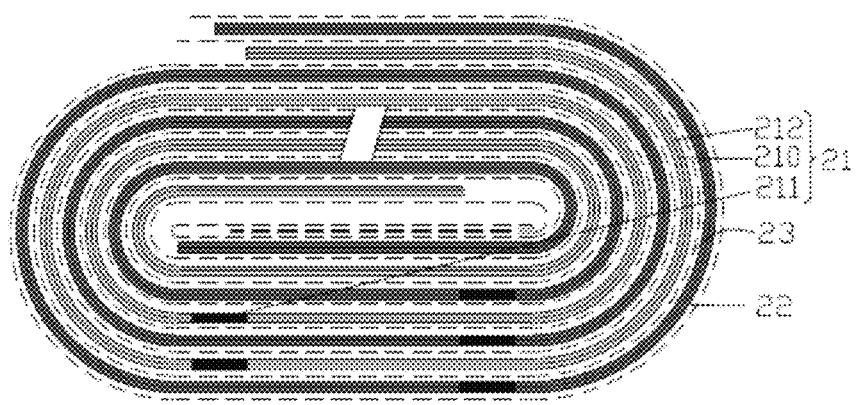
FIG. 2 is a top view of an electrode assembly of the electrochemical device shown in FIG. 1.

Referring to FIG. 1 and FIG. 2, an embodiment of this application provides an electrochemical device 100. The electrochemical device 100 includes a housing 10 and an electrode assembly 20 disposed in the housing 10. The electrode assembly 20 includes a first electrode plate 21, a second electrode plate 22, and a separator 23 disposed between the first electrode plate 21 and the second electrode plate 22. The separator 23 is configured to prevent direct contact between the first electrode plate 21 and the second electrode plate 22, so as to prevent a short circuit of the electrode assembly 20.

The first electrode plate 21, the separator 23, and the second electrode plate 22 are sequentially stacked to form a stacked electrode assembly, or wound to form a jelly-roll electrode assembly. In some specific embodiments, as shown in FIG. 2, the first electrode plate 21, the separator 23, and the second electrode plate 22 are wound to form a jelly-roll electrode assembly 20.

Figure 3:
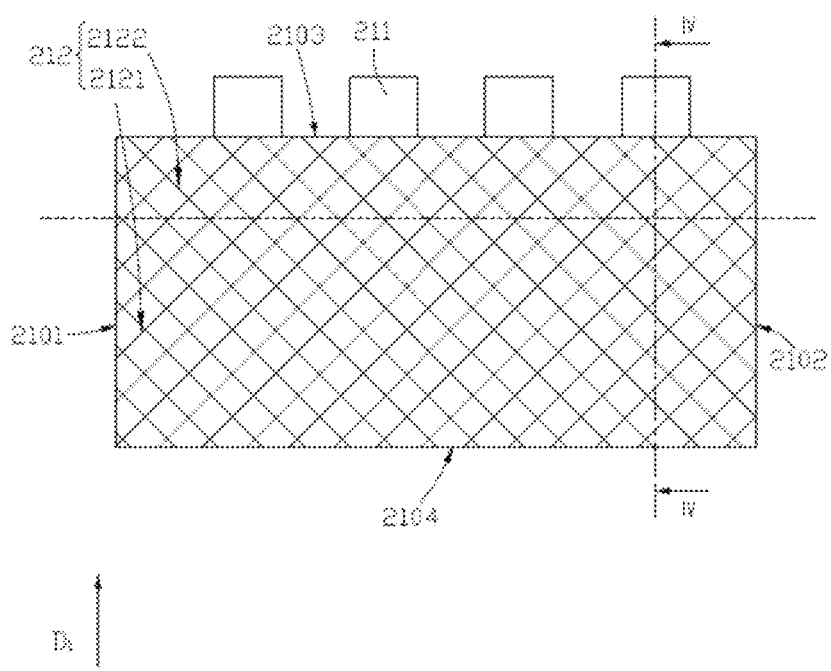
FIG. 3 is a schematic diagram of a first electrode plate of the electrode assembly shown in FIG. 2.
Figure 4:
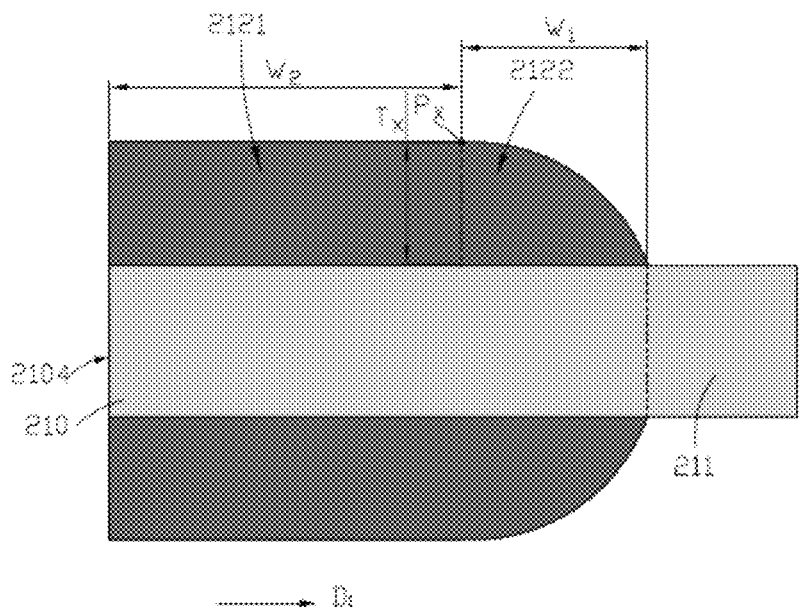
FIG. 4 is a sectional view of the first electrode plate shown in FIG. 3 and sectioned along an IV-IV line.

Referring to FIG. 2, FIG. 3, and FIG. 4, the first electrode plate 21 includes a current collector 210, a tab 211 electrically connected to the current collector 210, and an active material layer 212 disposed on the surface of the current collector 210. The current collector 210 includes a first end 2101, a second end 2102 opposite to the first end 2101, and a third end 2103 and a fourth end 2104 that are connected between the first end 2101 and the second end 2102. The third end 2103 and the fourth end 2104 are disposed opposite to each other. To be specific, the first end 2101 and the second end 2102 are two ends in the length direction and the width direction, respectively, of the current collector 210. Correspondingly, the third end 2103 and the fourth end 2104 are two ends in the width direction and the length direction, respectively, of the current collector 210. The tab 211 is integrally formed together with the current collector 210, and extends out of the third end 2103 (for example, the tab 211 is formed by cutting the current collector 210). The active material layer 212 is disposed on the surface of the current collector 210. Understandably, the current collector 210 includes two surfaces, and the active material layer 212 is disposed on at least one of the surfaces.

Still referring to FIG. 3, the active material layer 212 disposed on the first electrode plate 21 includes a body region 2121 and an edge region 2122. The body region 2121 extends from the first end 2101 to the second end 2102 of the current collector 210. The edge region 2122 also extends from the first end 2101 to the second end 2102 of the current collector 210. In addition, along the extension direction of the tab 211 (the direction D1 in FIG. 3), the edge region 2122 is closer to the third end 2103 of the current collector 210 than the body region 2121. The edge region 2122 is disposed contiguous to the body region 2121.

Understandably, both the body region 2121 and the edge region 2122 extend from the first end 2101 to the second end 2102, which does not necessarily mean that the surface of the current collector 210 from the first end 2101 to the second end 2102 covers both the body region 2121 and the edge region 2122. Apart of the surface of the current collector 210 may still be a single-side-coated region or an blank foil region. In the single-side-coated region, one side of the current collector 210 is coated with the active material layer 212, and the other side is a blank current collector 210. In the blank foil region, both sides of the current collector 210 are blank current collectors 210, without being coated with the active material layer 212. In addition, "contiguous" means that the two regions do not overlap at the position of contact between the body region 2121 and the edge region 2122. To be specific, in the thickness direction of the first electrode plate 21, no overlap exists between the projection of the body region 2121 and the projection of the edge region 2122.

Understandably, the extension direction of the tab 211, that is, the direction D1 in FIG. 3, may be either the width direction of the first electrode plate 21 or the length direction of the first electrode plate 21, depending on the specific shape of the first electrode plate 21.

Refer to FIG. 4. FIG. 4 is a sectional view of the first electrode plate 21 shown in FIG. 3 and sectioned along an IV-IV line. As shown in FIG. 4, the width of the edge region 2122 is $W_1$, the thickness of the edge region is $t_1$, the width of the body region 2121 is $W_2$, and the thickness of the body region is $t_2$, where $0 < W_1/W_2 \leq 5\%$, and $95\% \leq t_1/t_2 \leq 100\%$.

Generally, a preparation process of the electrode plate includes steps such as slurry preparation, electrode plate coating, electrode plate calendering, and electrode plate slitting. When the active material slurry prepared from the materials such as an active material is coated onto the surface of the current collector by extrusion coating. Most slurries are in a liquid state and capable of flowing. Therefore, under the action of surface energy and gravity, the amount of the active material at the edge of the surface of the current collector is relatively small. As viewed from the electrode plate, the thickness of the active material layer at the edge of the electrode plate is smaller than the thickness of the active material layer in the middle of the electrode plate, thereby forming a typical thin region. When the width of the thin region is relatively large, on the one hand, the content of the active material is relatively low in the thin region, and therefore, the energy density is reduced. On the other hand, if the active material layer of the negative electrode plate forms a thin region, then during a charge and discharge process, when the same amount of lithium ions are deintercalated from each unit area of active material layer on the positive electrode plate, the lithium ions are unable to be fully intercalated into a unit area of thin region of the negative electrode plate due to the relatively small amount of active material contained. Consequently, excessive lithium ions are accumulated on the surface of the thin region, and deposit to form lithium dendrites. The lithium dendrites are prone to pierce the separator and cause an electrochemical short circuit formed by direct contact between the negative electrode plate and the positive electrode plate, thereby impairing safety.

By controlling the width parameter and the thickness parameter of the edge region 2122 of the active material layer 212 to fall within the foregoing ranges, this application reduces the percentage of the area of the edge region 2122 in the active material layer 212, and increases the percentage of thickness of the edge region 2122 in contrast to the body region 2121. On the one hand, the content of the active material per unit area of the edge region 2122 is increased, thereby helping to increase the energy density of the electrochemical device 100. On the other hand, the lithium plating hazards are reduced, thereby improving the safety of the electrochemical device 100.

A method for distinguishing between the edge region and the body region in this application is described below: Taking a test sample of the electrode plate, sectioning the electrode plate along the width direction of the electrode plate to form a cross section perpendicular to the thickness direction of the electrode plate; under a microscope, taking test points at intervals of 50 μm from the edge of the electrode plate to the middle of the electrode plate, and denoting the test points as $P_1$, $P_2$, $P_3$, $P_4$, $P_5$, $P_6$, $P_x$, and so on in sequence. Correspondingly, the thickness values of the active material layer of the electrode plate are denoted as $T_1$, $T_2$, $T_3$, $T_4$, $T_5$, $T_6$, $T_x$, and so on in sequence. Defining $T_1$ as a thickness value at the edge position $P_1$ of the active material layer, that is, a test value at the 0 μm position. Similarly, $T_2$ is a test value at the 50 μm position $P_2$, $T_3$ is a test value at the 100 μm position $P_3$, and so on. The thickness of the active material layer means a distance from the surface of the active material layer to an interface between the active material layer and the current collector, that is, the thickness of the active material layer on the electrode plate on a single side. Then calculating the thickness increase rate at each position. To be specific, the thickness increase rate at the position $P_2$ is $K_1=(T_2-T_1)/T_1$, the thickness increase rate at the position $P_3$ is $K_2=(T_3-T_2)/T_2$, the thickness increase rate at the position $P_4$ is $K_3=(T_4-T_3)/T_3$, the thickness increase rate at the position $P_x$ is $K_{x-1}=(T_x-T_{x-1})/T_{x-1}$, and the like. A position at which the thickness increase rate is less than 1% is defined as a boundary point $P_x$ between the edge region and the body region. The width $W_1$ of the edge region is the distance between the boundary point $P_x$ and the edge point $P_1$ of the active material layer. The thickness $t_1$ of the edge region is an average value of the thickness values of all preceding test points that include the boundary point $P_x$. To be specific, $t_1=(T_1+T_2+T_3+\ldots+T_{x-2}+T_{x-1}+T_x)/(x)$. The width of the body region $W_2$ is a difference between a total width of the active material layer and $W_1$. The thickness $t_2$ of the body region is the thickness $T_x$ at the boundary point.

Understandably, in some embodiments, the active material layer 212 may be coated on just one surface of the current collector 210. The other surface of the current collector 210 may be coated with another active material layer. In some other embodiments, both surfaces of the current collector 210 are coated with the active material layer 212, so as to maximally increase the energy density of the electrochemical device and reduce the lithium plating hazards.

In some embodiments, the active material layer includes an active material and a binder. The active material is of a same type in the body region and the edge region, and the binder is of a same type in the body region and the edge region. In this way, in both the body region and the edge region, the current collector can be coated with the same active material slurry simultaneously, thereby reducing the coating steps.

In some embodiments, the first electrode plate 21 is a negative electrode plate, and correspondingly, the second electrode plate 22 is a positive electrode plate. The active material layer 212 is a negative active material layer, and includes a negative active material and a binder. The negative active material includes at least one of natural graphite, artificial graphite, mesocarbon microbead, hard carbon, soft carbon, silicon, a silicon-carbon composite, silicon oxide, lithium-tin alloy, lithium-tin-oxide alloy, metallic tin, tin oxide, lithium titanium oxide, lithium-aluminum alloy, or metallic lithium. With the first electrode plate being the negative electrode plate, the edge region provides more active materials for the intercalation and deintercalation of lithium ions, thereby reducing the lithium plating hazards of the negative electrode and improving the safety of the electrochemical device.

In some embodiments, the first electrode plate 21 is a positive electrode plate, and correspondingly, the second electrode plate 22 is a negative electrode plate. The active material layer 212 is a positive active material layer, and includes a positive active material and a binder. The positive active material includes at least one of lithium nickel cobalt manganese oxide, lithium nickel cobalt aluminum oxide, lithium iron phosphate, a lithium-rich manganese-based material, lithium cobalt oxide, lithium manganese oxide, lithium manganese iron phosphate, or lithium titanium oxide. With the first electrode plate being the positive electrode plate, the active material in the edge region provides more lithium ions, thereby helping to increase the energy density of the electrochemical device.

In some embodiments of this application, the width $W_1$ of the edge region 2122 and the width $W_2$ of the body region 2121 fall within the following ranges: 0 mm<$W_1$≤4 mm, and 10 mm≤$W_2$≤600 mm. Under such conditions, even if the width of the electrode plate is relatively large, the width of the edge region 2122 is still relatively small in contrast to the width of the electrode plate. In a case that the lengths of the electrode plates are equal, the percentage of the area of the edge region 2122 in the total area of the electrode plate is relatively low, thereby helping to increase the energy density of the electrode plate and reducing the lithium plating hazards at the edge of the electrode plate.

In some embodiments of this application, 19 μm≤$t_1$≤200 μm, and 20 μm≤$t_2$≤200 μm.

In some embodiments, the number of the tab 211 is at least two. With at least two tabs 211 disposed, the distribution of current of the first electrode plate 21 is prevented from being be too concentrated, and the internal resistance of the first electrode plate 21 can be reduced, thereby increasing the charge rate and discharge rate of the first electrode plate 21.

Figure 5:
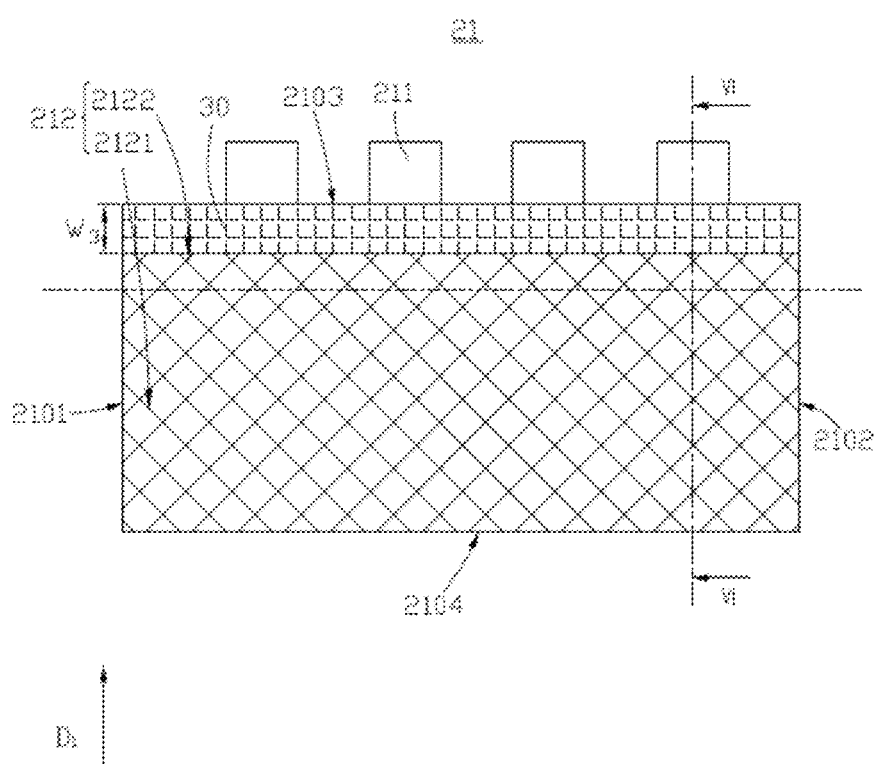
FIG. 5 is a schematic diagram of the first electrode plate of the electrode assembly shown in FIG. 2 according to some other embodiments.
Figure 6:
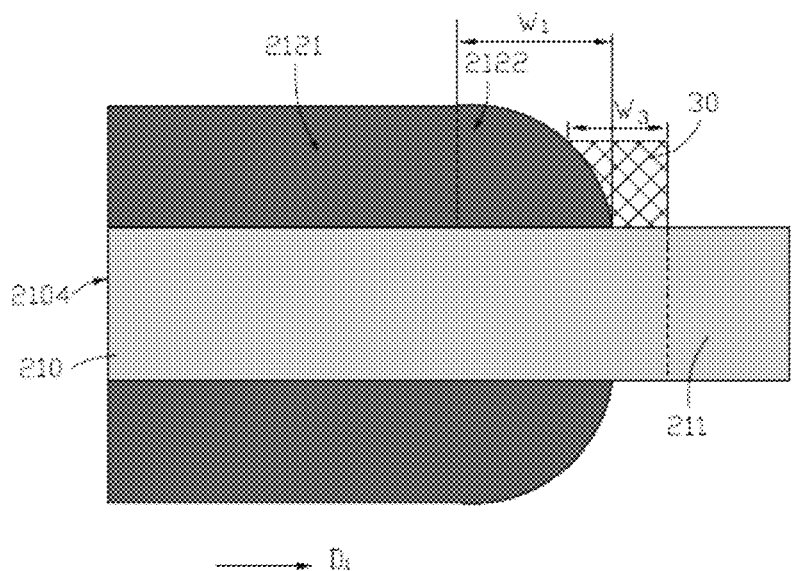
FIG. 6 is a sectional view of the first electrode plate shown in FIG. 5 and sectioned along a VI-VI line.

Referring to FIG. 5 and FIG. 6, in other embodiments, the first electrode plate 21 further includes an insulation layer 30 disposed on the surface of the current collector 210. The insulation layer 30 extends from the first end 2101 to the second end 2102. Along an extension direction of the tab 211, the insulation layer 30 is closer to the third end 2103 than the edge region 2122, and is disposed contiguous to the edge region 2122 or at least partly overlaps the edge region. To be specific, along the direction D1, the insulation layer 30 is located on a side of the edge region 2122, the side facing the first tab 211. The insulation layer 30 disposed can prevent the separator 23 from being pierced by buns generated during cutting of the first electrode plate 21, and thereby prevent a short circuit caused by contact between the positive electrode plate and the negative electrode plate; and also prevent the short circuit between the positive electrode and the negative electrode caused by factors such as shrinkage of the separator 23 under a high temperature.

Understandably, the "partly overlapping" in this application means that in the thickness direction of the electrode plate, an overlap exists between the projection of the edge region 2122 and the projection of the insulation layer 30. To be specific, in a region of contact between the edge region 2122 and the insulation layer 30, the edge of the insulation layer 30 partly covers the edge region 2122. In this case, in measuring the thickness of the edge region 2122, the interface between the active material layer 212 and the insulation layer 30 is used as a thickness measurement benchmark.

Figure 7:
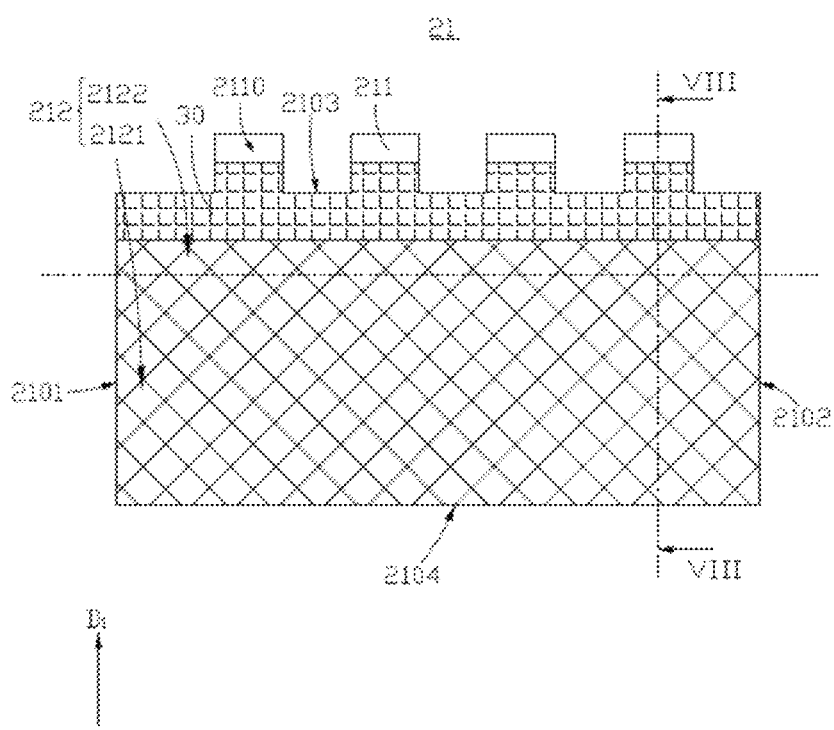
FIG. 7 is a schematic diagram of the first electrode plate of the electrode assembly shown in FIG. 2 according to still some other embodiments.
Figure 8:
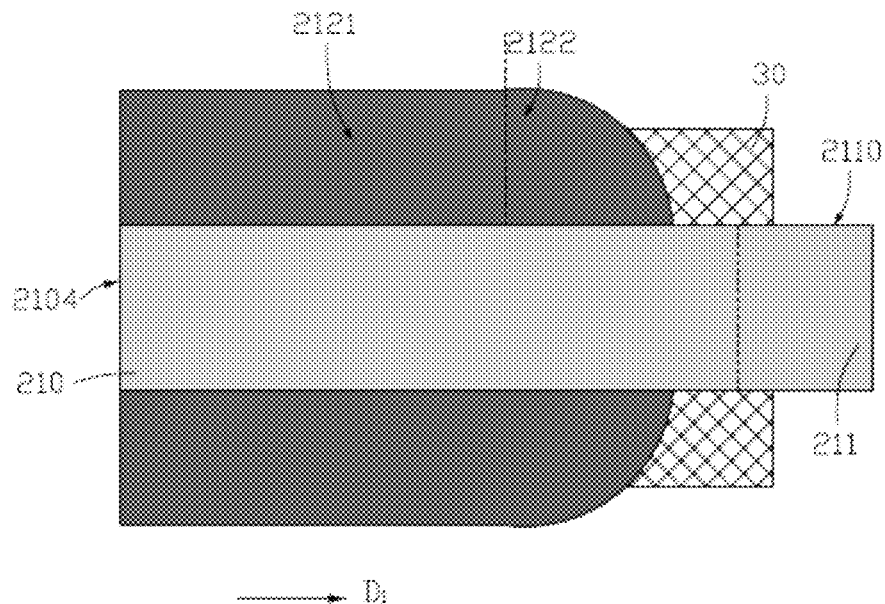
FIG. 8 is a sectional view of the first electrode plate shown in FIG. 7 and sectioned along a VIII-VIII line.

In some embodiments, the surface of the tab 211 is partly overlaid with the insulation layer 30, and is partly a blank foil region. As shown in FIG. 7 and FIG. 8, the insulation layer 30 is disposed at the end of the tab 211 (that is, the end where the tab 211 is connected to the current collector 210), and the head of the tab 211 (that is, the end, which is away from the current collector 210, of the tab 211) is set to be a blank foil region 2110. No insulation layer 30 is disposed in the blank foil region 2110. The blank foil region 2110 extends out of the housing 10, so as to be electrically connected to an external component. By disposing the insulation layer 30 on a part of the surface of the tab 211, this application can prevent the separator 23 from being pierced by the burrs generated during the cutting of the tab 211, and prevent a short circuit thereby caused.

In some embodiments, the insulation layer includes inorganic particles and a polymer. The inorganic particles include at least one selected from the group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, or barium sulfate. The polymer includes at least one of polypropylene alcohol, sodium polyacrylate, potassium polyacrylate, lithium polyacrylate, polyimide, polyamide imide, styrene butadiene rubber, polyvinyl alcohol, polyvinylidene fluoride, polyvinylidene difluoride, polytetrafluoroethylene, polyvinyl butyral, water-based acrylic resin, carboxymethyl cellulose and sodium carboxymethyl cellulose.

In some embodiments, the width of the insulation layer 30 is $W_3$, and 0.1 mm≤$W_3$≤4 mm. With the width of the insulation layer 30 falling within the foregoing range, the burrs are prevented from being generated during the cutting of the positive electrode plate, and the coating of the insulation layer 30 is prevented from significantly reducing the energy density of the electrochemical device 100. Understandably, the width of the insulation layer 30 does not include the width of the insulation layer 30 on the tab 211.

In some embodiments, the second electrode plate 22 may adopt a structure similar to that of the first electrode plate 21, and the structure is not described here again. By disposing the edge region also on the second electrode plate 22, with the parameter range being similar to that on the first electrode plate 21, this application reduces the percentage of the area of the edge region in the active material layer, and increases the percentage of thickness of the edge region in contrast to the body region. On the one hand, the content of the active material per unit area of the edge region is increased, thereby helping to increase the energy density of the electrochemical device 100. On the other hand, the lithium plating hazards are reduced, thereby improving the safety of the electrochemical device.

In some embodiments, the electrochemical device 100 according to this application further includes an electrolyte. The electrolyte may be at least one of a gel electrolyte, a solid-state electrolyte, and an electrolytic solution. The electrolytic solution includes a lithium salt and a nonaqueous solvent. In some embodiments of this application, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, lithium difluoroborate, or the like. Preferably, the lithium salt is $LiPF_6$ because it provides a high ionic conductivity and improves cycle characteristics. The nonaqueous solvent may be at least one of a carbonate compound, a carboxylate compound, an ether compound, another organic solvent, or the like. The carbonate compound may be at least one of a chain carbonate compound, a cyclic carbonate compound, a fluorocarbonate compound, or the like. The chain carbonate compound may include at least one of dimethyl carbonate (DMC), diethyl carbonate (DEC), dipropyl carbonate (DPC), methyl propyl carbonate (MPC), ethylene propyl carbonate (EPC), ethyl methyl carbonate (EMC), or the like. The cyclic carbonate compound may include at least one of ethylene carbonate (EC), propylene carbonate (PC), butylene carbonate (BC), vinyl ethylene carbonate (VEC), or the like. The fluorocarbonate compound may include at least one of fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or the like. The carboxylate compound may include at least one of methyl formate, methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, or the like. The ether compound may include at least one of dibutyl ether, tetraglyme, diglyme, 1,2-dimethoxyethane, 1,2-diethoxyethane, ethoxymethoxyethane, 2-methyltetrahydrofuran, tetrahydrofuran, or the like. The other organic solvent may include at least one of dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or the like.

Still referring to FIG. 1, in some embodiments of this application, the housing 10 may be a packaging bag obtained by sealing with a sealing film (such as an aluminum plastic film). In other words, the electrochemical device 100 may be a pouch-type battery. In some other embodiments, without being limited to a pouch-type battery, the electrochemical device 100 may be a steel- or aluminum-shell battery or the like instead. The type of the electrochemical device is not limited in this application.

Although a lithium-ion battery is used as an example for description above, the electrochemical device 100 in this application may be another device capable of electrochemical reactions. Specifically, the electrochemical device 100 may be a primary battery, a secondary battery, a fuel battery, a solar battery, or a capacitor (such as a supercapacitor). Optionally, the electrochemical device 100 may be a lithium secondary battery, including a lithium metal secondary battery, a lithium-ion secondary battery, a lithium polymer secondary battery, and a lithium-ion polymer secondary battery.

Figure 9:
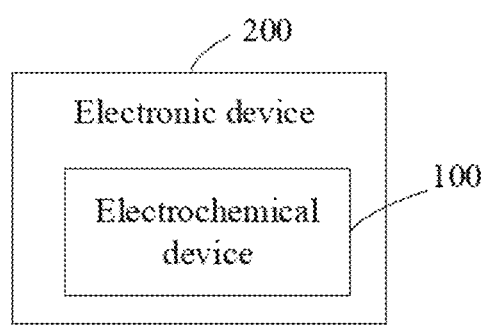
FIG. 9 is a module block diagram of an electronic device according to an embodiment of this application.

Referring to FIG. 9, this application further provides an electronic device 200, including the electrochemical device 100. The electronic device 200 according to this application may be, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, or the like.

The following describes this application in detail with reference to specific embodiments and comparative embodiments. This application is described below with reference to a specific preparation process and a test method using a lithium-ion secondary battery as an example. A person skilled in the art understands that the preparation method described in this application is merely an example. Any other appropriate preparation methods fall within the scope of this application.

Embodiment 1

An example is used here in which the first electrode plate is a positive electrode plate, and the second electrode plate is a negative electrode plate.

Preparing a positive electrode plate: Dissolving lithium iron phosphate, conductive carbon black, and polyvinylidene difluoride at a ratio of 96.5:1.5:2.0 in an N-methylpyrrolidone (NMP) solvent to form a positive active material slurry. Using an aluminum foil as a positive current collector, and affixing adhesive tape to the aluminum foil according to the design requirements on the width of the electrode plate. Further, forming a gravure primer by gravure printing according to the design requirements. Then coating the positive active material slurry onto a positive current collector that carries the adhesive tape and the gravure primer. Performing drying to remove the solvent (deionized water), and then performing steps such as adhesive peeling, dusting, cold pressing, tab forming, and cutting to obtain a positive electrode plate.

Preparing a negative electrode plate: Dissolving graphite, conductive carbon black, sodium carboxymethyl cellulose (CMC), and styrene butadiene rubber at a mass ratio of 96.5:1.0:1.0:1.5 in deionized water, and stirring the mixture with a vacuum mixer until a homogeneous state to obtain a negative active material slurry. Using a copper foil as a negative current collector, and affixing adhesive tape to the copper foil according to the design requirements on the width of the electrode plate. Further, forming a gravure primer by gravure printing according to the design requirements. Then coating the negative active material slurry onto a negative current collector that carries the adhesive tape and the gravure primer. Performing drying to remove the solvent (deionized water), and then performing steps such as adhesive peeling, dusting, cold pressing, tab forming, and cutting to obtain a negative electrode plate.

Preparing an electrolytic solution: Mixing ethylene carbonate (EC), ethyl methyl carbonate (EMC), and diethyl carbonate (DEC) at a mass ratio of EC:EMC:DEC=30:50:20 in an dry argon atmosphere to form an organic solvent, then adding hexafluorophosphate (LiPF$_6$) into the organic solvent to dissolve, and mixing the solution evenly to obtain an electrolytic solution in which a lithium salt concentration is 1.15 mol/L.

Preparing a battery: Putting a separator made of a PE material between the positive electrode plate and the negative electrode plate, and winding the plates to obtain an electrode assembly. Putting the electrode assembly into an outer packaging shell, drying the electrode assembly, and then injecting the electrolytic solution. Performing steps such as vacuum sealing, static standing, chemical formation, and shaping to obtain a lithium-ion battery.

Embodiment 2

This embodiment differs from Embodiment 1 in: Dissolving aluminum oxide and polyacrylic acid at a mass ratio of 80:20 in an N-methyl-pyrrolidone (NMP) solvent to form an insulation material slurry. Affixing adhesive tape to the aluminum foil according to the design requirements on the width of the electrode plate. Further, forming a gravure primer by gravure printing according to the design requirements. Then coating the positive active material slurry onto a positive current collector that carries the adhesive tape and the gravure primer. After the solvent (deionized water) is removed by drying, peeling off adhesive. Coating the insulation material slurry onto the exposed positive current collector stripped of adhesive. Then performing drying again to remove the solvent (deionized water), and then performing steps such as dusting, cold pressing, tab forming, and cutting to obtain a positive electrode plate.

Comparative Embodiment 1

This comparative embodiment differs from Embodiment 1 in: When preparing the positive electrode plate, using an aluminum foil as a positive current collector, and forming a gravure primer by gravure printing according to the design requirements. Then coating the positive active material slurry onto a positive current collector that carries the gravure primer. Performing drying to remove the solvent (deionized water), and then performing steps such as dusting, cold pressing, tab forming, and cutting to obtain a positive electrode plate.

Comparative Embodiment 2

This comparative embodiment differs from Embodiment 2 in: When preparing the negative electrode plate, using a copper foil as a negative current collector, and forming a gravure primer by gravure printing according to the design requirements. Then coating the negative active material slurry onto a negative current collector that carries the gravure primer. Performing drying to remove the solvent (deionized water), and then performing steps such as dusting, cold pressing, tab forming, and cutting to obtain a negative electrode plate.

The thickness and width of the electrode plates in each embodiment and comparative embodiment are tested. For the specific test method, refer to the description above. The test results are recorded in Table 1 and Table 2. The electrode plates in each embodiment and comparative embodiment are assembled to form a lithium-ion battery, and the energy density (ED) and the lithium plating are tested on each battery. The burrs at the edge of the current collector are observed under a microscope. The test results are recorded in Table 3.

The test steps of the energy density include: Putting the battery in a thermostat in which the temperature is 25° C.±2° C., charging the battery at a current of 0.7 C (C is the nominally rated battery capacity) until the voltage reaches 4.35 V, where the cutoff current is 0.025 C; and discharging the battery at a current of 0.2 C until a voltage of 3.0 V to obtain the battery capacity, and then dividing the battery capacity by the battery volume to obtain the energy density. The energy density increase rate achieved in an embodiment is a ratio of a difference to the energy density achieved in Comparative Embodiment 1, where the difference is a difference between the energy density achieved in the embodiment and the energy density achieved in Comparative Embodiment 1.

The test steps of lithium plating include: Putting the battery into a thermostat in which the temperature is 25° C.±2° C., and leaving the battery to stand for 2 hours; then charging the battery at a constant current of 3 C until the voltage reaches 4.4 V, charging the battery at a constant voltage of 4.4 V until the current reaches 0.02 C, and leaving the battery to stand for 15 minutes; and then discharging the battery at a constant current of 0.5 C until the voltage reaches 3.0 V, thereby completing a lithium plating test cycle; repeating the lithium plating test cycle for 100 cycles, then discharging the battery at a constant current of 0.5 C until the voltage reaches 3.00 V, and disassembling the battery; and checking whether lithium plating occurs on the surface of the active material layer of the negative electrode plate, where gray positions indicate lithium plating, and no lithium plating occurs if there is no gray positions.

TABLE 1

Test results of positive electrode plate

| | Edge region | | Body region | | Insulation layer | | |
|---|---|---|---|---|---|---|---|
| | $W_1$ (mm) | $t_1$ (μm) | $W_2$ (mm) | $t_2$ (μm) | $W_3$ (mm) | $W_1/W_2$ | $t_1/t_2$ |
| Embodiment 1 | 0.50 | 51.4 | 99.5 | 52.2 | / | 0.5% | 98.5% |
| Embodiment 2 | 3.50 | 154.4 | 295.3 | 160.6 | 1.2 | 1.18% | 96.1% |
| Comparative Embodiment 1 | 15.00 | 24.2 | 85.0 | 52.2 | / | 17.6% | 46.4% |
| Comparative Embodiment 2 | 0.50 | 51.4 | 99.5 | 52.2 | / | 0.5% | 98.5% |

TABLE 2

Test results of negative electrode plate

| | Edge region | | Body region | | | |
|---|---|---|---|---|---|---|
| | $W_1$ (mm) | $t_1$ (μm) | $W_2$ (mm) | $t_2$ (μm) | $W_1/W_2$ | $t_1/t_2$ |
| Embodiment 1 | 0.60 | 62.8 | 100.4 | 63.6 | 0.59% | 98.7% |
| Embodiment 2 | 3.05 | 168.2 | 298.95 | 170.4 | 1.02% | 98.7% |

TABLE 2-continued

Test results of negative electrode plate

| | Edge region | | Body region | | | |
|---|---|---|---|---|---|---|
| | $W_1$ (mm) | $t_1$ (μm) | $W_2$ (mm) | $t_2$ (μm) | $W_1/W_2$ | $t_1/t_2$ |
| Comparative Embodiment 1 | 0.60 | 62.8 | 100.4 | 63.6 | 0.59% | 98.7% |
| Comparative Embodiment 2 | 18.20 | 31.4 | 82.8 | 63.6 | 22% | 49.4% |

TABLE 3

Battery performance test results

| | Burrs on positive electrode plate | Energy density increase rate (%) | Lithium plating status of negative electrode |
|---|---|---|---|
| Embodiment 1 | Slight amount of burrs in partial regions | 20 | No lithium plating |
| Embodiment 2 | No burrs | 16 | No lithium plating |
| Comparative Embodiment 1 | Slight amount of burrs in partial regions | / | No lithium plating |
| Comparative Embodiment 2 | Slight amount of burrs in partial regions | 20 | Lithium plating in partial regions |

As can be seen from the data in Table 1, with respect to the positive electrode plate, in both Embodiment 1 and Embodiment 2 in contrast to Comparative Embodiment 1, the width ratio between the edge region and the body region is relatively low, and the thickness ratio between the edge region and the body region is relatively high. In other words, on the positive electrode plate, the area occupied by the edge region is relatively small, but the thickness of the edge region is almost the same as the thickness of the body region. Therefore, in contrast to Comparative Embodiment 1, the content of the positive active material in both Embodiment 1 and Embodiment 2 increases, thereby providing more lithium ions. As shown in Table 3, in contrast to Comparative Embodiment 1, the energy density of the batteries in both Embodiment 1 and Embodiment 2 is increased.

As can be seen from the data in Table 2, with respect to the negative electrode plate, in both Embodiment 1 and Embodiment 2 in contrast to Comparative Embodiment 2, the width ratio between the edge region and the body region is relatively low, and the thickness ratio between the edge region and the body region is relatively high. In other words, on the negative electrode plate, the area occupied by the edge region is relatively small, but the thickness of the edge region is almost the same as the thickness of the body region. Therefore, in contrast to Comparative Embodiment 2, the content of the negative active material in both Embodiment 1 and Embodiment 2 increases, thereby providing more space for accommodating lithium ions to be intercalated. As shown in Table 3, in contrast to Comparative Embodiment 2, lithium plating occurs in neither Embodiment 1 nor Embodiment 2, thereby improving safety of the battery.

In addition, as can be seen from Table 3, in contrast to Embodiment 1, an insulation layer is disposed on the positive electrode plate in Embodiment 2. The insulation layer prevents the generation of buns, and helps to improve the safety of the battery.

What is described above is merely optimized specific embodiments of this application, but this application is not limited to the embodiments in practice. Other variations and modifications, which may be made by a person of ordinary skill in the art based on the technical conception of this application, fall within the protection scope of this application.

What is claimed is:

1. An electrochemical device, comprising:
   a housing and an electrode assembly accommodated in the housing;
   the electrode assembly comprises a first electrode plate, a second electrode plate, and a separator disposed between the first electrode plate and the second electrode plate;
   wherein the first electrode plate comprises:
   a current collector comprising a first end, a second end disposed opposite to the first end, a third end and a fourth end;
   the third end and the fourth end are connected between the first end and the second end, wherein the third end and the fourth end are disposed opposite to each other;
   a tab integrally formed together with the current collector, and extending out of the third end; and
   an active material layer disposed on a surface of the current collector, wherein the active material layer has a thickness, and the thickness of the active material layer is a distance from a surface of the active material layer to an interface between the active material layer and the current collector; the active material layer comprises a body region and an edge region, both the body region and the edge region extend from the first end to the second end, and, along a direction in which the tab extends out of the third end, the edge region is closer to the third end than the body region, and the edge region is disposed contiguous to the body region;
   wherein, widths of the edge region and the body region are $W_1$ and $W_2$ respectively, and $0<W_1/W_2≤0.05$; and thicknesses a thickness of the edge region and a thickness of the body region are $t_1$ and $t_2$ respectively, and $0.95≤t_1/t_2≤1$;
   along a direction from an edge of the active material layer in the edge region towards a boundary point between the edge region and the body region, the thickness of the active material layer increases; wherein the boundary point is a position at which the thickness of the active material layer increases less than 1% relative to the thickness of the active material layer at another position located at a distance of 50 μm from said position towards the edge of the active material layer.

2. The electrochemical device according to claim 1, wherein the active material layer comprises an active material and a binder, the active material is of a same type in the body region and the edge region, and the binder is of a same type in the body region and the edge region.

3. The electrochemical device according to claim 2, wherein the first electrode plate is a negative electrode plate, and the active material comprises at least one selected from the group consisting of natural graphite, artificial graphite, mesocarbon microbead, hard carbon, soft carbon, silicon, a silicon-carbon composite, silicon oxide, lithium-tin alloy, lithium-tin-oxide alloy, metallic tin, tin oxide, lithium titanium oxide, lithium-aluminum alloy and metallic lithium.

4. The electrochemical device according to claim 2, wherein the first electrode plate is a positive electrode plate, and the active material comprises at least one selected from the group consisting of lithium nickel cobalt manganese oxide, lithium nickel cobalt aluminum oxide, lithium iron phosphate, a lithium-rich manganese-based material, lithium cobalt oxide, lithium manganese oxide, lithium manganese iron phosphate and lithium titanium oxide.

5. The electrochemical device according to claim 4, wherein the first electrode plate further comprises an insulation layer disposed on the surface of the current collector, the insulation layer extends from the first end to the second end, and, along the direction in which the tab extends out of the third end, the insulation layer is closer to the third end than the edge region, and is disposed contiguous to the edge region or at least partly overlaps the edge region.

6. The electrochemical device according to claim 5, wherein the insulation layer comprises inorganic particles and a polymer, the inorganic particles comprise at least one selected from the group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, or barium sulfate, and the polymer comprises at least one of polypropylene alcohol, sodium polyacrylate, potassium polyacrylate, lithium polyacrylate, polyimide, polyamide imide, styrene butadiene rubber, polyvinyl alcohol, polyvinylidene fluoride, polyvinylidene difluoride, polytetrafluoroethylene, polyvinyl butyral, water-based acrylic resin, carboxymethyl cellulose and sodium carboxymethyl cellulose.

7. The electrochemical device according to claim 5, wherein a width of the insulation layer is $W_3$, and $0.1 \text{ mm} \leq W_3 \leq 4 \text{ mm}$.

8. The electrochemical device according to claim 1, wherein $0 < W_1 \leq 4 \text{ mm}$, $10 \text{ mm} \leq W_2 \leq 600 \text{ mm}$.

9. The electrochemical device according to claim 8, wherein $19 \text{ μm} \leq t_1 \leq 200 \text{ μm}$, and $20 \text{ μm} \leq t_2 \leq 200 \text{ μm}$.

10. The electrochemical device according to claim 1, wherein the electrode plate comprises a plurality of tabs.

11. An electronic device, comprising an electrochemical device,
wherein the electrochemical device comprises a housing and an electrode assembly accommodated in the housing, wherein the electrode assembly comprises a first electrode plate, a second electrode plate, and a separator disposed between the first electrode plate and the second electrode plate, wherein the first electrode plate comprises:
a current collector, comprising a first end, a second end disposed opposite to the first end, and a third end and a fourth end; the third end and the fourth end are connected between the first end and the second end, wherein the third end and the fourth end are disposed opposite to each other;
a tab, integrally formed together with the current collector, and extending out of the third end; and
an active material layer, disposed on a surface of the current collector, wherein the active material layer has a thickness, and the thickness of the active material layer is a distance from a surface of the active material layer to an interface between the active material layer and the current collector; the active material layer comprises a body region and an edge region, both the body region and the edge region extend from the first end to the second end, and, along a direction in which the tab extends out of the third end, the edge region is closer to the third end than the body region, and the edge region is disposed contiguous to the body region;
wherein, widths of the edge region and the body region are $W_1$ and $W_2$ respectively, and $0 < W_1/W_2 \leq 0.05$; and thicknesses a thickness of the edge region and a thickness of the body region are $t_1$ and $t_2$ respectively, and $0.95 \leq t_1/t_2 \leq 1$;
along a direction from an edge of the active material layer in the edge region towards a boundary point between the edge region and the body region, the thickness of the active material layer increases; wherein the boundary point is a position at which the thickness of the active material layer increases less than 1% relative to the thickness of the active material layer at another position located at a distance of 50 μm from said position towards the edge of the active material layer.

12. The electronic device according to claim 11, wherein the active material layer comprises an active material and a binder, the active material is of a same type in the body region and the edge region, and the binder is of a same type in the body region and the edge region.

13. The electronic device according to claim 12, wherein the first electrode plate is a negative electrode plate, and the active material comprises at least one of natural graphite, artificial graphite, mesocarbon microbead, hard carbon, soft carbon, silicon, a silicon-carbon composite, silicon oxide, lithium-tin alloy, lithium-tin-oxide alloy, metallic tin, tin oxide, lithium titanium oxide, lithium-aluminum alloy, or metallic lithium.

14. The electronic device according to claim 12, wherein the first electrode plate is a positive electrode plate, and the active material comprises at least one of lithium nickel cobalt manganese oxide, lithium nickel cobalt aluminum oxide, lithium iron phosphate, a lithium-rich manganese-based material, lithium cobalt oxide, lithium manganese oxide, lithium manganese iron phosphate, or lithium titanium oxide.

15. The electronic device according to claim 14, wherein the first electrode plate further comprises an insulation layer disposed on the surface of the current collector, the insulation layer extends from the first end to the second end, and, along the direction in which the tab extends out of the third end, the insulation layer is closer to the third end than the edge region, and is disposed contiguous to the edge region or at least partly overlaps the edge region.

16. The electronic device according to claim 15, wherein the insulation layer comprises inorganic particles and a polymer, the inorganic particles comprise at least one selected from the group consisting of aluminum oxide, silicon dioxide, magnesium oxide, titanium oxide, hafnium dioxide, tin oxide, cerium dioxide, nickel oxide, zinc oxide, calcium oxide, zirconium dioxide, yttrium oxide, silicon carbide, boehmite, aluminum hydroxide, magnesium hydroxide, calcium hydroxide, or barium sulfate, and the polymer comprises at least one of polypropylene alcohol, sodium polyacrylate, potassium polyacrylate, lithium polyacrylate, polyimide, polyamide imide, styrene butadiene rubber, polyvinyl alcohol, polyvinylidene fluoride, polyvinylidene difluoride, polytetrafluoroethylene, polyvinyl butyral, water-based acrylic resin, carboxymethyl cellulose and sodium carboxymethyl cellulose.

17. The electronic device according to claim 15, wherein a width of the insulation layer is $W_3$, and $0.1 \text{ mm} \leq W_3 \leq 4 \text{ mm}$.

18. The electronic device according to claim 11, wherein $0 < W_1 \leq 4 \text{ mm}$, $10 \text{ mm} \leq W_2 \leq 600 \text{ mm}$.

19. The electronic device according to claim 18, wherein $19 \text{ μm} \leq t_1 \leq 200 \text{ μm}$, and $20 \text{ μm} \leq t_2 \leq 200 \text{ μm}$.

20. The electronic device according to claim 11, wherein the electrode plate comprises a plurality of tabs.

* * * * *